United States Patent [19]

Podhrasky

[11] 4,303,879

[45] Dec. 1, 1981

[54] METAL DETECTOR CIRCUIT WITH MODE SELECTION AND AUTOMATIC TUNING

[75] Inventor: Robert J. Podhrasky, Dallas, Tex.

[73] Assignee: Garrett Electronics, Garland, Tex.

[21] Appl. No.: 7,311

[22] Filed: Jan. 29, 1979

[51] Int. Cl.³ .................. G01V 3/11; G01V 3/165
[52] U.S. Cl. .................................................. 324/329
[58] Field of Search ........................... 324/326–330, 324/334, 339, 232, 233

[56] References Cited

U.S. PATENT DOCUMENTS

| | | | |
|---|---|---|---|
| 2,442,805 | 6/1948 | Gilson | 324/328 X |
| 2,447,316 | 8/1948 | Curtis | 324/327 X |
| 2,557,194 | 6/1951 | Milsom | . |
| 2,557,994 | 6/1951 | Ostlund | 324/327 X |
| 2,642,477 | 6/1953 | Puranen et al. | 324/330 X |
| 2,806,992 | 9/1957 | Foerster | . |
| 2,808,723 | 10/1957 | Buntenbach | . |
| 2,919,413 | 12/1959 | Charles | 324/327X |
| 2,929,984 | 3/1960 | Puranen et al. | 324/330 X |
| 3,012,190 | 12/1961 | Doll | 324/329 X |
| 3,020,470 | 2/1962 | Shawhan et al. | 324/329 |
| 3,020,475 | 2/1962 | Walton | 324/326 X |
| 3,052,837 | 9/1962 | Arbogast et al. | 324/329 |
| 3,065,407 | 11/1962 | Huddleston, Jr. et al. | 324/339 |
| 3,112,443 | 11/1963 | Buckner, Jr. | 324/339 |
| 3,147,429 | 9/1964 | Moran | 324/339 |
| 3,150,314 | 9/1964 | Tanguy | 324/339 |
| 3,201,774 | 8/1965 | Uemura | 324/327 X |
| 3,202,909 | 8/1965 | Stewart | 324/329 |
| 3,214,686 | 10/1965 | Elliott et al. | 324/339 |
| 3,259,838 | 7/1966 | Thomsen | 324/339 |
| 3,315,155 | 4/1967 | Colani | . |
| 3,316,762 | 5/1967 | Westersten | . |
| 3,322,967 | 5/1967 | Gessner | . |
| 3,329,906 | 7/1967 | Bringert | 324/327 X |
| 3,337,796 | 8/1967 | Hentschell et al. | 324/233 |
| 3,340,464 | 9/1967 | Gouilloud | 324/339 |
| 3,344,346 | 9/1967 | Halsey | . |
| 3,355,658 | 11/1967 | Gardiner | 324/328 |
| 3,391,336 | 7/1968 | Hentschell | . |
| 3,443,212 | 5/1969 | Renken | . |
| 3,453,532 | 7/1969 | Gardiner | . |
| 3,467,855 | 9/1969 | Rance | . |
| 3,471,772 | 10/1969 | Smith | 324/329 |
| 3,471,773 | 10/1969 | Penland | 324/329 |
| 3,487,294 | 12/1969 | Youmans et al. | 324/339 |
| 3,492,564 | 1/1970 | Baker, Jr. | 324/328 X |
| 3,496,455 | 2/1970 | Gouilloud | 324/339 |
| 3,519,919 | 7/1970 | Rance | 324/328 |
| 3,521,153 | 7/1970 | Moss | 324/334 |
| 3,555,408 | 1/1971 | Robinson | 324/330 |
| 3,581,194 | 5/1971 | Tegholm | 324/334 |
| 3,601,691 | 8/1971 | Gardiner | 324/327 |
| 3,609,522 | 9/1971 | Hutchins | 324/334 |
| 3,614,600 | 10/1971 | Ronka | 324/334 X |
| 3,619,771 | 11/1971 | Hentschell | . |
| 3,626,279 | 12/1971 | Walden | 324/328 X |
| 3,662,255 | 5/1972 | Garrett | 324/328 |
| 3,676,772 | 7/1972 | Lee | 324/233 |
| 3,686,564 | 8/1972 | Mallick, Jr. et al. | 324/232 |
| 3,697,972 | 10/1972 | Brown | . |
| 3,707,672 | 12/1972 | Miller et al. | . |
| 3,715,655 | 2/1973 | Dowling et al. | 324/339 |
| 3,737,768 | 6/1973 | Lazenby et al. | . |
| 3,760,400 | 9/1973 | Galvin et al. | . |
| 3,808,519 | 4/1974 | Lemecier et al. | 324/326 X |
| 3,823,365 | 7/1974 | Anderson | 324/328 |
| 3,826,973 | 7/1974 | Pflaum | 324/329 |
| 3,826,976 | 7/1974 | Winston et al. | 324/233 |
| 3,828,242 | 8/1974 | Vann | 324/328 |
| 3,831,173 | 8/1974 | Lerner | . |
| 3,835,371 | 9/1974 | Mirdadian et al. | 324/329 |
| 3,836,842 | 9/1974 | Zimmerman et al. | . |
| 3,852,659 | 12/1974 | Barringer | 324/334 |
| 3,852,663 | 12/1974 | Brooke et al. | . |
| 3,890,564 | 6/1975 | Watanabe et al. | . |
| 3,896,371 | 7/1975 | Hametta | 324/327 |
| 3,950,695 | 4/1976 | Barringer | 324/334 |
| 3,961,238 | 6/1976 | Randolph, Jr. | 324/327 |
| 3,986,104 | 10/1976 | Randolph, Jr. | 324/327 |
| 4,002,979 | 1/1977 | Giori et al. | . |
| 4,004,212 | 1/1977 | Wortman | . |
| 4,004,234 | 1/1977 | Juvinall | . |
| 4,006,407 | 2/1977 | Flaherty et al. | . |
| 4,008,469 | 2/1977 | Chapman | . |
| 4,024,468 | 5/1977 | Hirschi | 324/329 |
| 4,030,026 | 6/1977 | Payne | 324/329 |
| 4,070,612 | 1/1978 | McNeill et al. | 324/334 |
| 4,213,093 | 7/1980 | Pecori | 324/329 |

FOREIGN PATENT DOCUMENTS 637336 5/1950 Canada .
480447 1/1952 Canada .

| | | |
|---|---|---|
| 691344 | 5/1953 | Canada . |
| 1180550 | 10/1964 | Fed. Rep. of Germany . |
| 1036629 | 7/1966 | United Kingdom . |

OTHER PUBLICATIONS

"Detecting Set, Mine" Dept. of the Army Tech. Manual TM5-9540, Dept. of the Air Force Tech. Order T039B,-40-5, Jul. 1952.

"Detection of Land Mines and Sound Ranging" Office of Scientific Research and Development, Declassified 26 Jun., 1969.

"Operation, Maintenance, Overhaul and List of All Parts Manual for Detecting Set, Mine, Aural Indication, 10 Volt DC . . . Woodcase", Oregon Technical Products, Aug. 9, 1963.

Lee, Robt. D., "Metallic Intrusion Detector System", National Technical Information Service No. N70-41949, 1970.

"Operation, Maintenance, Overhaul and List of All Parts Manual for Detecting Set, Mine, Portable, Metallic Model P-158" Polan Industries, Inc.

Model VP200 Advertising Brochure Bulletin No. VP154.

Colani, C., "A New Type of Locating Device", Archaeometry, vol. 9, 1969.

Colani, C., "A New Method and Wide-Range Apparatus for Locating Metal Objects in the Ground, Fresh Water & Salt Water", Prospezioni Archeolog. 1966.

"Pulse Induction Metal Detectors" by Pulse Induction Ltd.

"Auto-Pulse 1", A New Concept in Metal Detection.

"C400 MK III" A Powerful General Purpose Metal Detector produced by GEO Electronics.

Hentschell, "Eddy Current Comparators" by ACCO, Jun. 1972.

Fisher M-Scope VLF 553D Detector Operator's Manual.

Lancaster, Donald E., "Electronic Metal Locators", Electronics World, Dec. 1966, pp. 39-42, 62.

Garret Electronics Super TR Metal Detector Schematic Diagram.

*Primary Examiner*—Gerard R. Strecker
*Attorney, Agent, or Firm*—Richards, Harris & Medlock

[57] ABSTRACT

A metal detector (10) is disclosed which has a transmit coil (48) and a receive coil (150) for detecting a metal object due to a change in the magnetic coupling between the coils (48, 150). The metal detector (10) has a plurality of operating modes and for each mode an operating parameter is selected and stored. Each operating parameter is used to generate a demodulation signal. A multiposition switch (36) is manipulated by an operator to select one of the operating modes. A logic circuit (191) is provided to route the demodulation signals to a demodulation circuit (110) to operate on a receive signal from the receive coil (150). An audible signal produced by the metal detector (10) is inhibited when operating modes are changed. An automatic tuning circuit (228) has selectable slewing rates for nulling the output from the metal detector (10).

11 Claims, 4 Drawing Figures

METAL DETECTOR CIRCUIT WITH MODE SELECTION AND AUTOMATIC TUNING

FIELD OF THE INVENTION

The present invention pertains to a metal detector and more particularly to circuit apparatus for selecting a mode of operation and automatically adjusting circuit parameters for operation in the selected mode.

BACKGROUND ART

A metal detector operates by measuring the change in an electromagnetic field when a target object enters the field. In one type of metal detector, the electromagnetic field is established by an alternating current flowing through a transmit coil. A receive coil which resides within this field is employed to measure a change in the field thus producing a detection signal. A circuit in the metal detector is preset to a threshold level and any increase in the detection signal causes the generation of an audible and visual signal for alerting the operator. Although there are various types of circuits used in metal detectors, there are two modes of operation which are frequently employed. In a ground cancellation mode, the detector is adjusted so as to ignore the response generated by layers of permeable ferrous material within the soil. This eliminates spurious responses which are generated by wide ranging ferrous deposits that are generally of no interest to the operator. In the second mode, the discrimination mode, the metal detector circuit is adjusted to discriminate between various types of target objects.

As an operator is conducting a search he selects the mode which is most appropriate for the conditions and the objectives of his search. However, the circuits utilized by the metal detectors must be tuned to different settings for each of the operating modes. Therefore it is difficult and time consuming for an operator to switch from one mode to the other, an operation often requiring the use of two hands. But, for the most effective search procedure, it is frequently necessary that the operator make such mode changes.

Therefore, a need exists for a metal detector having a conveniently located control apparatus wherein the operator can easily and rapidly select the desired mode of operation while at the same time having a circuit automatically tune the metal detector for optimum operation in that mode. Further, rapid mode selection should not create interference with the audio response monitored by the operator nor should the automatic tuning respond too fast and cause a target to be missed or too slow and waste the operator's time.

DISCLOSURE OF THE INVENTION

A metal detector has a transmit and a receive coil to detect metal objects by a change in the magnetic coupling between the coils. The metal detector has various modes of operation, including ground cancellation, to eliminate the response caused by ferrous mineralization deposits and discrimination to limit responses to only certain types of objects. For each of the various modes of operation a parameter is selected, stored and used to generate a demodulation signal. A switch mechanism and circuit is provided for selecting the mode of operation for the metal detector. The demodulation signal associated with the selected mode is then utilized to demodulate a receive signal produced by the receive coil. During the transition from one mode to another, the audio output generated by the metal detector is inhibited while the detector circuit stabilizes. Further, an automatic tuning circuit can be operated either continuously or only during the time of mode transition.

DETAILED DESCRIPTION OF THE INVENTION

Figure 1:
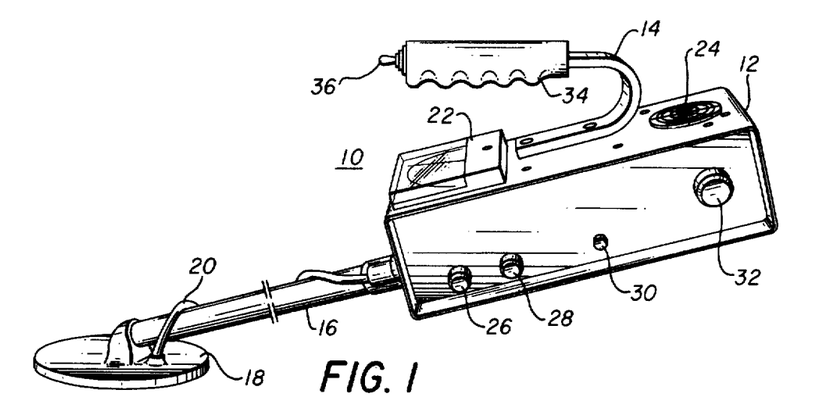
FIG. 1 is a perspective view of a metal detector in accordance with the present invention.

Referring to FIG. 1 a metal detector shown generally as 10 has a body 12 that is supported by a handle 14. An arm 16 is connected to the body 12 and has mounted at the opposite end thereof a search coil 18. The search coil is connected to the electronic circuitry within the detector 10 by a cable 20.

The signals generated by the metal detector 10 are visually displayed by a meter 22 and aurally produced by a speaker 24. The detector 10 can be manually tuned in its various operating modes by use of control potentiometer 26, 28 and 30. The sensitivity of the instrument is adjusted by operation of control potentiometer 32.

A grip 34 is mounted on handle 14 to provide easy handling by an operator. At the extreme end of handle 14 there is mounted a multiple position switch 36 which the operator manipulates to select the desired operating mode for the detector 10.

To use the metal detector 10 the operator grasps the grip 34 with his hand and supports the detector so that the search coil 18 is positioned a short distance above the earth's surface. After completing initial tuning operations the operator scans the search coil 18 over the search area while monitoring a detection signal by observing the meter 22 or listening to the speaker 24. By operating switch 36 the operator selects the mode of operation of the detector 10 which is most appropriate for the terrain and the type of search targets. Switch 36 is spring actuated and is normally in the center position. The desired mode is selected by pushing the switch to either the right or left hand position. In a ground cancellation mode the detector 10 rejects ferrous mineralization deposits in the search area to eliminate spurious responses which such ground minerals produce. When a signal response is generated the operator can then manipulate switch 36 and operate the detector 10 in a discrimination mode to determine to some extent the type of target which has been detected. Based on this information the operator can then determine whether or not to dig up the target object. If in the discriminate mode the detector 10 does not produce the desired response the operator can then switch back by means of switch 36 to the ground cancellation mode and continue his search. The operator is thus able to make a broad general search and to specifically examine each response without the need to retune the detector. This feature substantially reduces the time required for the operator to examine a given search area while permitting him to search for a particular type of target.

Figure 2A:
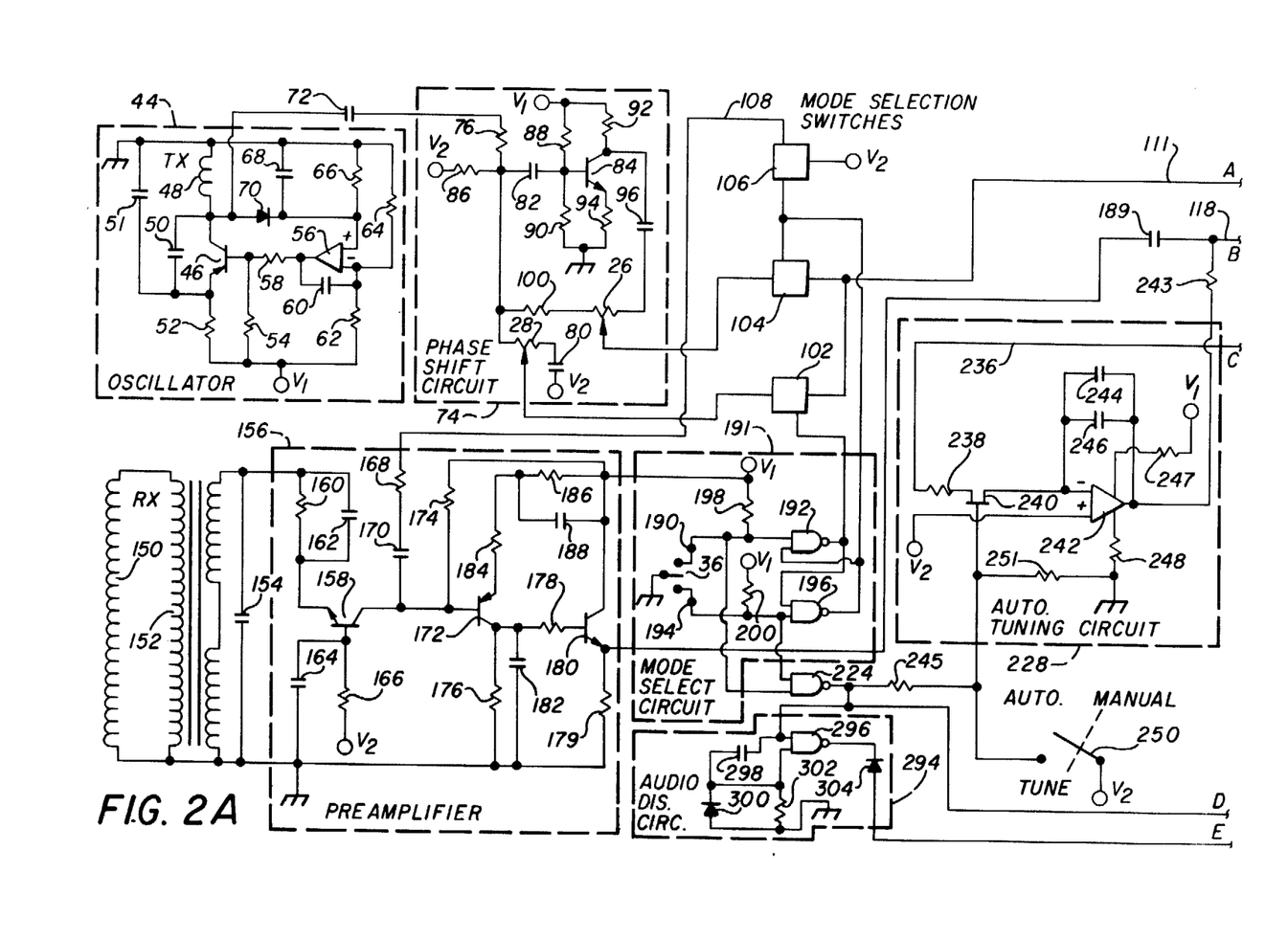
FIGS. 2A and 2B are schematic diagrams of a metal detector circuit having a mode selection feature, variable rate tuning control and audio disable.
Figure 2B:
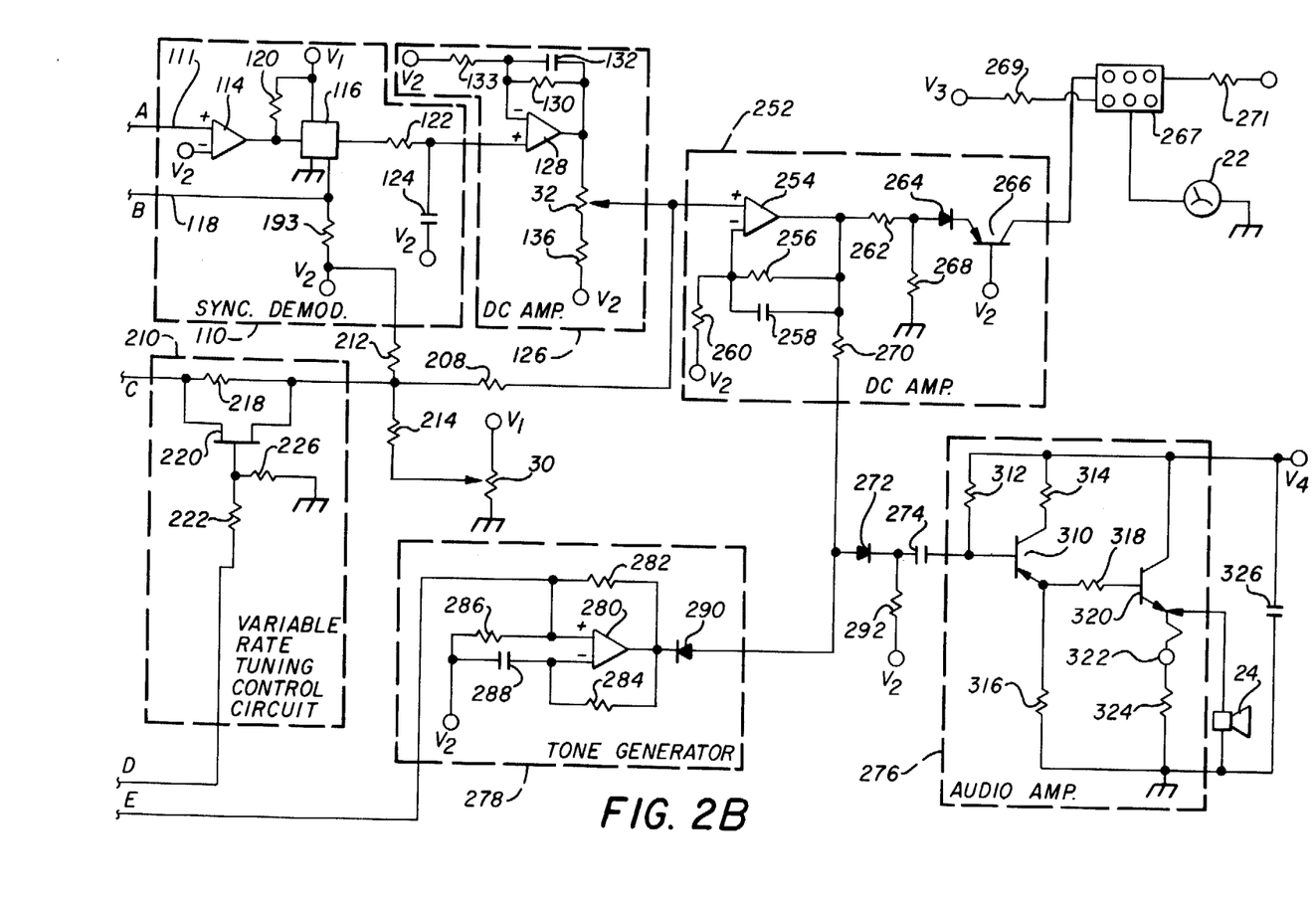

The metal detector circuit of the present invention is shown in FIGS. 2A and 2B. An oscillator 44 includes a transistor 46 and a tank circuit consisting of a transmit coil 48 together with capacitors 50 and 51. An emitter resistor 52 and a base resistor 54 are connected to a voltage source $V_1$. The remaining components within oscillator 44 are utilized to maintain a constant amplitude for the signal which drives transmit coil 48. The output of an operational amplifier 56 is connected through a resistor 58 to the base of transistor 46. A capacitor 60 is connected as a feedback element between the output of operational amplifier 56 and the inverting inputs thereof. The inverting input is also connected to the voltage source $V_1$ through voltage divider resistors 62 and 64. The signal produced by oscillator 44 is peak detected using diode 70 and capacitor 68 which are connected to the noninverting input of operational amplifier 56, to which a bleed resistor 66 is also connected.

Oscillator 44 generates a constant amplitude signal, which in an exemplar embodiment is 5.5 khz, the signal being passed through coil 48 to generate an electromagnetic field which is directed into the search area.

The signal generated by the oscillator 44 is also transmitted through a capacitor 72 to a phase shift circuit 74. In the phase shift circuit the signal generated by oscillator 44 is provided to separate phase shift controls corresponding to the ground cancellation mode of operation and the discrimination mode of operation. After the oscillator signal passes through capacitor 72 it is transferred through resistor 76 and through the potentiometer 28 which is connected to a capacitor 80. A ground cancellation signal is produced at the wiper connection to potentiometer 28 by adjusting the position of the wiper to change the RC value of the circuit and therefore produce different degrees of phase shift. The phase shift produced by this circuit is generally in the range of about 10° to 20° depending upon the degree of iron mineralization present in the search area.

A phase shift for the discrimination mode is provided by transferring the oscillator signal through a capacitor 82 to the base of a transitor 84. A resistor 86 is connected between a voltage source $V_2$ and the junction of resistor 76 with capacitor 82. Resistors 88 and 90 are connected between voltage source $V_1$ and ground and are joined to the base of resistor 84 to bias the transistor. The transistor circuit further includes a collector resistor 92 connected to voltage source $V_1$ and an emitter resistor 94 which is connected to ground. Transistor 84 serves to invert the signal produced by oscillator 44 and thereby produce a signal which is approximately 180° out of phase with the oscillator signal. This out-of-phase signal is passed through a capacitor 96 to a potentiometer control 26. The second terminal of potentiometer 26 is connected through a resistor 100 to receive the signal produced by oscillator 44. By moving the wiper of potentiometer 26 from one end to the other a variable phase signal is produced. The signal produced at the wiper of potentiometer 26 is utilized by the metal detector in the discriminate mode, as described below. The ground cancellation signal produced at the wiper of potentiometer 28 is passed to a mode selection switch 102. The discrimate mode signal produced at the wiper of potentiometer 26 is carried to a mode selection switch 104. Switch 106 is driven by the same control logic as switch 104 to connect line 108 to voltage source $V_2$.

The ground cancellation signal and discriminate mode signal are selectively passed through switches 102 and 104 and carried by a line 111 to a synchronous demodulator 110.

The phase shifted signal transmitted over line 111 is provided to a noninverting input of an operational amplifier 114 which has a reference voltage $V_2$ supplied to the inverting input. Amplifier 114 serves as a voltage comparator and generates a square wave demodulator drive signal which is in phase with the input signal to operational amplifier 114. The demodulator drive signal is provided to the control terminal of a solid state switch 116. A receive signal is transmitted over line 118 to the input terminal of switch 116 wherein the signal is demodulated by the square wave input on the control line. The control line terminal to switch 116 is connected through a resistor 120 to the voltage source $V_1$. The demodulation signal at the output terminal of switch 116 is transferred through a resistor 122 to a capacitor 124. The capacitor 124 is charged to a DC level which is a function of the received signal on line 118 and the demodulation drive signal input to switch 116.

The DC signal held on capacitor 124 is input to a DC amplifier 126, the amplifier comprising an operational amplifier 128 having a feedback resistor 130 and a feedback capacitor 132 connected in parallel and tied to the inverting input of the amplifier. The DC signal from switch 116 is transmitted to the noninverting input of operational amplifier 128. A resistor 133 is connected between voltage source $V_2$ and the junction of resitor 130 with capacitor 132 at the inverting input to amplifier 128. the output of operational amplifier 128 is passed through control potentiometer 32 to the wiper terminal thereof. The free terminal of potentiometer 32 is connected through a resistor 136 to voltage source $V_2$.

The amount of electromagnetic energy generated by the transmit coil 48 and passed to a receive coil 150 changes when a medium is encountered that alters the character of the electromagnetic field. The electromagnetic field induces a signal in the receive coil 150. This receive signal is transferred through an impedance matching tansformer 152 having a capacitor 154 connected across the output terminals thereof. The receive signal is transferred to a preamplifier circuit 156. Preamplifer 156 includes a transistor 158 which has the received signal transferred through a parallel combination of resistor 160 and capacitor 162 to the emitter terminal thereof. The base terminal of transistor 158 is connected through a capacitor 164 to ground and is also connected through a resistor 166 to voltage source $V_2$. The collector of transistor 158 is connected to voltage source $V_1$ through resistor 174. Switch 106 provides a means of selectively connecting voltage source $V_2$ to resistor 168 which is in turn connected through capacitor 170 to the collector of transistor 158. Activation of switch 106 lowers the gain of preamplifier 156. The collecter terminal of transistor 158 is also directly coupled to the base of transistor 172 for transferring the received signal thereto. The collector current of transistor 172 is supplied through resistor 176 which is connected to ground.

The received signal is amplified by transistor 172 and transferred through a resistor 178 to a transistor 180 configured as an emitter follower with an emitter resistor 179. A capacitor 182 is connected to the collecter terminal of transistor 172 to filter out high frequency components from the received signal. The emitter circuit of transistor 172 comprises a resistor 184 in series with a parallel combination of a resistor 186 and a capacitor 188. The emitter circuit components of transistor 172 are connected to voltage source $V_1$.

The amplified received signal at the emitter terminal of transistor 180 is connected through capacitor 189 and line 118 to the input terminal of switch 116. A resistor 193 is connected between voltage source $V_2$ and line 118.

Within a mode selection circuit 191, the mode selection switch 36 has three operating positions. The switch arm is connected to ground, and in the center, resting, position the arm is not connected to any terminal. When the arm of switch 36 is connected to terminal 190 a ground signal is applied to a first input of a NAND gate 192. When the arm of switch 36 is positioned in contact with a terminal 194 a ground is applied to a first input of a NAND gate 196. The first input terminal of NAND gate 192 is connected through a resistor 198 to voltage source $V_1$ while the first terminal of NAND gate 196 is connected through a resistor 200 to voltage source $V_1$.

The output of NAND gate 192 is connected to the second input of NAND gate 196 and the output of NAND gate 196 is connected to the second input of NAND gate 192. This configuration of NAND gates functions as a set/reset flip flop having two stable states. The output of NAND gate 192 is connected to the control terminal of switch 102 to transfer the signal used in the ground cancelling mode from phase shift circuit 74 to the synchronous demodulator 110. The output of NAND gate 196 is connected to the control terminals of switches 104 and 106. When a control terminal of switch 104 is activated the signal used in the discrimination mode is transferred from the phase shift circuit 74 to the demodulator 110. The output signals of NAND gates 192 and 196 are the inverse of each other therefore only one signal will be connected through switches 102 and 104 to line 111 at any one time. The output of NAND gate 196 is also connected to switch 106 to provide a connection between line 108 and voltage source $V_2$.

After the received signal is demodulated and converted to a DC level in the synchronous demodulator 110 and amplified in the DC amplifier 126 the signal is transferred from the wiper terminal of potentiometer 32, which functions as a sensitivity control, through a resistor 208 to a variable rate tuning control circuit 210. The signal applied to circuit 210 is adjusted by a DC bias circuit comprising resistors 212, 214 and the control potentiometer 30. Resistor 212 is connected to voltage source $V_2$ while resistor 214 is connected to the wiper of potentiometer 30 which has its end terminals connected between voltage source $V_1$ and ground. Adjustment of potentiometer 30 establishes the DC bias of the signal input to variable rate tuning control circuit 210.

Circuit 210 comprises a resistor 218 in parallel with a field effect transistor 220. The gate terminal of transistor 220 is connected through a voltage divider made up of resistor 222 and resistor 226 to the output of NAND gate 224. The free terminal of resistor 226 is connected to ground.

The variable rate tuning control circuit 210 provides an input path to an automatic tuning circuit 228. Circuit 210 provides either a high impedance path or a low impedance path depending upon the state of NAND gate 224. When the output of NAND gate 224 is high the transistor 220 is activated and a low impedance path is provided but when the transistor 220 is not activated a high impedance path through resistor 218 is provided.

When circuit 210 is in the high impedance state, tuning circuit 228 has a slow slew rate, but when circuit 210 is in a low impedance state, tuning circuit 228 has a rapid slew rate toward a tuned condition.

Tuning circuit 228 has input thereto on line 236 the DC signal which has been produced by demodulating the received signal. The signal on line 236 is passed through a resistor 238 to a field effect transistor 240 which is in turn connected to the inverting input of a differential amplifier 242. Reference voltage $V_2$ is supplied to the noninverting input of amplifier 242. The output of amplifier 242 is connected through a resistor 242 to line 118. A feedback circuit comprising a parallel combination of capacitors 244 and 246 is connected between the output of amplifier 242 and the inverting input thereto. A control signal is generated by NAND gate 224 and transmitted through resistor 245 to the gate terminal of transistor 240. The received signal passed through line 236 is transmitted to the inverting input of amplifier 242 when transistor 240 is activated. The power for amplifier 242 is supplied from voltage source $V_1$ through resistor 247. A second power connection to amplifier 242 is made by the connection through resistor 248 to ground. The gate terminal of transistor 240 is connected through a resistor 251 to ground. Tuning circuit 228 varies the DC bias level of the received signal carried on line 118. This bias level is adjusted by operation of circuit 228 until the inputs to operational amplifier 242 are balanced.

The tuning circuit 228 operates in one of two modes as controlled by a switch 250. When switch 250 is set to the auto position the switch arm thereof connects voltage source $V_2$ to the gate terminal of transistor 240 to cause the automatic tuning operation to be functioning at all times regardless of the mode of operation of the overall circuit. When the switch 250 is set to the manual position the tuning operation occurs only when switch 36 is connected to either one of terminals 190 or 194. This condition is carried out by the connection of terminals 190 and 194 to the inputs of NAND gate 224. The output of NAND gate 224 is connected through a resistor 245 to the gate terminal of transistor 240. This connection causes the automatic tuning circuit 228 to be activated whenever switch 36 is not in the center resting position.

The DC level receive signal produced by DC amplifier 126 is also provided to a second DC amplifier circuit 252. The received DC signal is provided to the noninverting input of an operational amplifier 254 which has a feedback circuit connected to the inverting input thereof. The feedback circuit consists of a parallel combination of a resistor 256 and a capacitor 258. The inverting input of amplifier 254 is connected through resistor 260 to voltage source $V_2$. The output of amplifier 254 is a high level DC signal proportional to the received signal produced by synchronous demodulator 110. This high level DC signal is provided to meter 22 through a series circuit comprising a resistor 262, a diode 264 and a transistor 266. The junction of the resistor 262 with diode 264 is connected through a resistor 268 to ground. The base terminal of transistor 266 is connected to voltage source $V_2$.

The collector of transistor 266 is connected through a connector board 267 to meter 22. Resistors 269 and 271 are connected to terminals on board 267.

The high level DC signal is also transferred through a resistor 270, a diode 272 and a capacitor 274 to an audio amplifier 276.

The high level DC signal is converted to a chopped DC signal by operation of a tone generator circuit 278. Circuit 278 is essentially an oscillator which produces a square wave signal at a frequency of approximately 400 cycles per second. The oscillator includes an amplifier 280 having feedback resistors 282 and 284 connected respectively to the noninverting and inverting input terminals of amplifier 280. The voltage source $V_2$ is connected through a resistor 286 to the noninverting input of amplifier 280 while the same voltage source is connected through a capacitor 288 to the inverting input thereof. The output of tone generator circuit 278 is a square wave signal which is transferred through a diode 290 that is forward biased when the square wave is of a low amplitude and reversed biased when the square wave is at a high amplitude. The effect of the tone generator circuit 278 is to apply a low signal level to the junction point of resistor 270 and diode 272 whenever the signal produced by the circuit is at the low level. This acts to chop the high level DC signal produced by DC amplifier circuit 252. The result is that the high level DC signal passed through diode 272 is an alternating signal. The junction of diode 272 with capaciter 274 is connected through a resistor 292 to voltage source $V_2$.

An audio disable circuit 294 momentarily interrupts the audio tone provided to the operator at the time a mode of operation is selected by operation of switch 36. Without such a tone interruption the operator would be subjected to a loud and meaningless tone at the time of mode transition. The audio disable circuit 294 operates in response to NAND gate 224 which goes to a high level whenever switch 36 is activated. The signal output by NAND gate 224 is provided as a first input to a NAND gate 296. The momentary time delay provided by audio disable circuit 294 is accomplished by operation of a time delay circuit which includes a capacitor 298 that is connected in series between the first and second inputs to NAND gate 296. A diode 300 has its anode terminal grounded and its cathode terminal connected to the second input of NAND gate 296. A resistor 302 is connected in parallel with diode 300 and has one terminal thereof connected to ground. A diode 304 has the cathode terminal thereof connected to the output of NAND gate 296 with the anode terminal connected to the noninverting input of amplifier 280. In a first condition the output of NAND gate 296 is high because both inputs are at a low level. But when a high level signal is generated by NAND gate 224 this signal immediately begins to charge capacitor 298 through resistor 302. While the capacitor 298 is charging the output of NAND gate 296 is made low which in turn forward biases diode 304 and deactivates the tone generator circuit 278. This action terminates the audio signal which is provided to the audio amplifier 276. But when capacitor 298 becomes charged, the level on the second input of NAND gate 296 will become low and the output will transition to a high level to reverse bias diode 304 which allows tone generator circuit 278 to again oscillate and produce the audio output provided to amplifier 276.

The audio amplifier 276 receives the chopped DC receive signal through capacitor 274 and amplifies the signal to drive speaker 24. The signal is provided through a first driver transistor 310 which has a base resistor 312 connected to a voltage source $V_4$. A resistor 314 is connected between the collector terminal of transistor 310 and voltage source $V_4$ while a resistor 316 is connected between the emitter terminal thereof and ground. The audio signal is coupled from transistor 310 through a resistor 318 to the base terminal of a transistor 320 which has the collector terminal thereof connected directly to voltage source $V_4$. Speaker 24 is driven from the emitter terminal of transistor 320. An earphone jack and switch 322 are provided along with a resistor 324 to enable the operator to monitor the audio output of the circuit through head phones in place of the speaker 24 which is disabled when an earphone plug is inserted. A capacitor 326 is connected between the voltage source $V_4$ and ground to filter the power supplied to audio amplifier 276.

Figure 3:
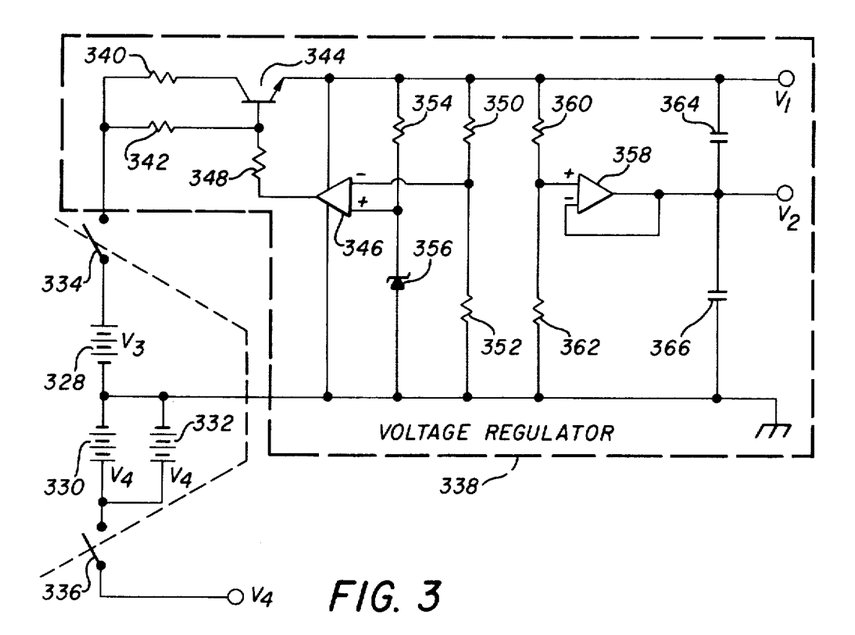
FIG. 3 is a schematic diagram of a power supply and voltage regulator for the metal detector circuit of the present invention.

FIG. 3 shows a schematic diagram of the power supply and voltage regulator circuit that generates the voltages necessary to drive the circuit of the present invention. A battery package includes a plurality of batteries 328, 330 and 332 which generate voltages $V_3$ and $V_4$ as shown. The batteries are connected to the remainder of this circuit by means of switches 334 and 336.

A voltage regulator circuit 338 receives voltage $V_3$ through resistors 340 and 342 which are connected respectively to the collector and base terminals of a transistor 344. The output of an operational amplifier 346 is connected through a resistor 348 to the base terminal of transistor 344. The power for operational amplifier 346 is supplied by a first connection to the emitter terminal of transistor 344 and a second connection to ground. The inverting input of amplifier 346 is connected through a resistor 350 which is in a series combination with a resistor 352 with the series combination connected between the emitter of transistor 344 and ground. The noninverting input to amplifier 346 is provided by the series combination of a resistor 354 and zener diode 356, the series combination being connected between the emitter of transistor 344 and ground.

A second operational amplifier 358 has the noninverting input thereof connected at the junction of a series combination of resistors 360 and 362, the combination being connected between the emitter of transistor 344 and ground. The output of amplifier 358 is connected directly to the inverting input thereof as a feedback circuit. The output of amplifier 358 is further connected to the junction of capacitors 364 and 366 which are connected at the remaining terminals thereof respectively to the terminal providing voltage $V_1$ and ground. The direct output of amplifier 358 supplies voltage $V_2$. The voltage regulator circuit 338 receives power from batteries 328, 330 and 332 and produces stable voltages $V_1$ and $V_2$ for driving the remainder of the metal detector circuit.

In an exemplary embodiment of the present invention switches 102, 104, 106 and 116 are field effect transistor switches.

Operation of the circuit of the present invention is now described in reference to FIGS. 2A and 2B. Transmit coil 48 produces an electromagnetic signal at a frequency of approximately 5 khz. Receive coil 150 is physically located in the vicinity of transmit coil 48 such that in a non-conductivity region with magnetic permeability of unity, the magnetic coupling between the transmit and receive coils approaches zero. An open air space has such a character and can thus be used to initially tune the metal detector circuit. When thus exposed only to open air there will be no signal induced in the received coil 150 due to the transmit coil 48. However, when a target is located in the vicinity of the transmit and receive coils and the target is conductive and/or has permeability other than unity, there will be a coupling of energy from the transmit coil 48 into the receive coil 150. The received signal is passed through an impedance matching transformer 152 which couples the receive coil 150 to the preamplifier circuit 156. After amplification the receive signal is transferred to the synchronous demodulator 110.

Synchronous demodulator 110 is driven by either one of the two signals generated by phase shift circuit 74. The signal produced by oscillator 44 and provided to transmit coil 48 is also conveyed to phase shift circuit 74 which has a ground cancelling section and a target discrimination section. These two sections correspond to the two possible modes of operation for the metal detector circuit of the present invention. The phase reference signal produced by oscillator 44 is input to an RC combination comprising potentiometer 28 and capacitor 80. The phase shifted signal for ground cancellation is tapped at the potentiometer 28 wiper and the degree of phase shift is manually adjusted by movement of the wiper along the resistive body of the potentiometer.

The discrimination phase shift signal is produced at the wiper of potentiometer 26 which has the phase reference signal input at one terminal of the resistive element and the inverse of the phase reference signal provided to the remaining terminal. The wiper arm of potentiometer 26 is shifted along the resistive body to select the desired phase shift for the discrimination mode. The two phase shift signals are stored by adjusting the respective potentiometers and are selectively applied to the synchronous demodulator 110 by operation of the mode selection switches 102 and 104.

Within the synchronous demodulator 110 the phase shift signals are transformed into a square wave drive signal which operates the solid state switch 116. Switch 116 is turned on and off by operation of the drive signal to pass certain portions of the received signal. The portions thus passed are used to charge capacitor 124 which averages the DC level of the signal transferred through switch 116. Note that the charge level on capacitor 124 will be a function of the phase difference between the demodulator drive signal produced by phase shift circuit 74 and the received signal, the amplitude of the receive signal and the DC offset signal provided by the tuning circuit 228.

The received signal comprises essentially two components which are displaced by 90°. These are the reactive component and the resistive component, each of which is produced due to the reactive or resistive nature of the material in the field of the transmit and receive coils. Ground mineralization due to ferrous material in the sail produces a signal which is primarily reactive. Target objects on the other hand produce receive signals which have various ratios of reactive and resistive components.

Ground mineralization produces a reactive signal component that tends to interfere with the signals produced by desired target objects. The reduction of the interfering effects due to ground mineralization is produced by operation of the metal detector circuit in the ground cancellation mode. In this mode the demodulator drive signal is set to have a phase relationship to the received signal such that the demodulator passes equal positive and negative portions of the received waveform component which is produced due to the reactive nature of material in the field of the transmit and receive coils. This equalization tends to substantially eliminate the reactive component due to ground mineralization. It, however, does not eliminate the resistive component of the received signal which is generated by other objects in the search field.

When using the metal detector 10 the operator often wishes to distinguish a certain class of targets. In particular the operator generally desires to concentrate his search efforts on metal objects such as coins rather than metal objects such as pull-tabs and metallic fragments. Selectivity of this nature is provided by operating the circuit of the present invention in the discrimination mode. Each type of metal object in the search field produces both a reactive and a resistive component in the received signal with the ratio of the components being related to the size, shape and nature of the target material. The potentiometer 26 within the discrimination section of phase shift circuit 74 is adjusted to provide a given phase relationship between the demodulator drive signal and the received signal. The phase relationship is set such that a threshold is established to produce an appropriate response only when the received signal reactive and resistive components exceed a given ratio. Desired targets generate a positive response while undesired targets generate a negative response.

The detected signal comprises a DC level at the output of synchronous demodulator 110. This DC level signal is amplified in DC amplifier 126 and transferred to a second DC amplifier 252. The tone generator circuit 278 operates at a frequency of approximately 400 hertz and functions to chop the DC level signal to produce an alternating signal. Although the signal is chopped the amplitude is maintained. The chopped DC signal is coupled into the audio amplifier 276 which in turn drives the speaker 24.

When using the metal detector the operator generally desires to search in the ground cancellation mode and when a signal is produced the operator then transfers to the discrimination mode to determine whether the object generating the received signal is within the class selected by the tuning of the discrimination circuit. In order to cover a large search area the operator must frequently shift from the ground cancellation mode to the discrimination mode. In previous metal detectors the ability to retune simultaneously and automatically at each mode change does not exist. The circuit of the present invention incorporates an automatic tuning circuit together with a selection switch and stored tuning parameters which makes it possible for the operator to rapidly shift from one mode to the other by operating a single switch and without the need for returning the detector.

The mode selection is accomplished by operation of mode selection circuit 191 wherein there is the switch 36 which has a center rest position and is deflected to the side positions to connect to either terminal 190 or 194. Switch 36 operates a mode selection flip flop which consists of NAND gates 192 and 196. When the switch arm is connected to terminal 190 the output of NAND gate 192 is set to a high level which in turn activates switch 102 and applies the ground cancellation phase shift signal to the synchronous demodulator 110. This sets the metal detector circuit to operate in the ground cancellation mode. But when the switch arm of switch 36 is connected to terminal 194, NAND gae 196 is set to have a high level output which activates switch 104 and applies the discrimination phase shift signal to the synchronous demodulator 110. The outputs of NAND gates 192 and 196 are inverses so that only a single signal is applied to the synchronous demodulator. Thus, the operator need operate only switch 36 to change from one mode of operation to the other.

A further degree of automatic tuning is provided by circuit 228 which can be operated in both the ground cancellation and discrimination modes. Circuit 228 acts to tune out residual resistive or reactive components which are present in the search field. Further, circuit 228 tends to compensate for circuit drifts or component value changes due to temperature variations. The circuit is operated in either of two modes as controlled by switch 250. When in the automatic mode the tuning circuit 228 operates at all times but in the manual mode the circuit provides tuning only while the switch 36 is connected to either terminal 190 or 194. Circuit 228 acts to apply a bias to the received signal provided by preamplifier 156 so that the applied bias offsets the DC level produced by synchronous demodulator 118. The tuning circuit utilizes operational amplifier 242 along with capacitors 244 and 246 to equalize the signals input to the amplifier which in turn reduces the output of the synchronous demodulator 110 to a preset level. In the automatic mode this action however takes place over an extended predetermined time interval so that the tuning operation does not counteract the signal generated by objects in the search field. When switch 250 is actuated, the speed of the tuning operation is increased. This electronic control circuit responding to switch 250 provides the operator with the ability to operate the metal detector in a continuous tuning mode, whose tuning rate is selected for optimum performances over the soil while not tuning out or eliminating responses from detected targets.

The circuit further provides a second tuning rate which allows, on demand, the circuit to adjust at the desired near instantaneous rate. The need for such an adjustment results from a mode change operation or a change in operating environment (i.e. when the search coil is lowered to the ground).

The differing rates of operation for the automatic tuning circuit 228 are provided by the variable rate tuning control circuit 210. In the automatic mode the control circuit 210 supplies a high impedance path between the output of DC amplifier 126 and the input to the tuning circuit 228. This causes the tuning circuit to operate slowly over an extended time interval. But in the manual mode the variable rate tuning control circuit 210 in response to operation of NAND gate 224 supplies a low impedance path to the tuning circuit 228. This provides for a very rapid adjustment of the tuning circuit 228 during the time that the operator holds the switch arm of switch 36 against either terminal 190 or 194.

During a mode change operation as described above, the circuits in the detector are momentarily unbalanced, until the tuning operation is complete. This unbalance causes an audio output which is not related to the detection of an object in the target field. This signal can cause a distraction to the operator so audio disable circuit 294 is provided to temporarily disable the audio output during the manual tuning operation. During the manual tuning operation the output of NAND gate 224 generates a signal which is transferred to NAND gate 296. Due to the RC network connected to the input terminals of gate 296 the output of this gate will momentarily drop to a low level. The period of time at the low level is a function of the time constant of the RC elements at the input of NAND gate 296. When the output of NAND gate 296 is at the low level, diode 304 is forward biased and the operation of tone generator circuit 278 is stopped. This in turn eliminates the chopping action provided to the DC level receive signal and removes the audio signal provided to amplifier 276. Thus, during a preselected time interval, which in this embodiment is set to be approximately one half second, the audio output provided through speaker 24 is eliminated. The variable rate tuning control circuit 210 is set to essentially complete the tuning operation during the disable time interval established by audio disable circuit 294.

Thus the present invention provides a single switch manipulated by the operator for selecting either of two modes of operation wherein the circuit is preset to operate in both of these modes. A circuit is provided to automatically tune the receive signal to eliminate residual components with the tuning rate variable as selected by the operator. When a rapid tuning rate is selected an audio disable circuit removes the audio signal provided to the operator until the tuning operation is completed.

Although an embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

I claim:

1. A metal detector circuit, comprising:
an oscillator for producing a transmit signal;
a transmit coil connected to receive said transmit signal and produce an electromagnetic field;
a receive coil located in the region of said electromagnetic field for producing a receive signal;
means for storing a first parameter for a first mode of operation for said metal detector circuit;
means for storing a second parameter for a second mode of operation for said metal detector circuit;
means for receiving said transmit signal or said receive signal and operating in conjunction with said means for storing a first parameter and said means for storing a second parameter to provide a first relative phase shift between said transmit signal and said receive signal for operation of said metal detector circuit in said first mode and a second relative phase shift between said transmit signal and said receive signal for operation of said metal detector circuit in said second mode;
a synchronous demodulator connected to receive said transmit signal and said receive signal, after provision of said first or said second relative phase shifts, for demodulating said receive signal to produce an output signal, said output signal for indicating detection of an object by said metal detector circuit;
a mode selection circuit having first and second states for respectively selecting said first mode or said second mode of operation for said metal detector circuit;
means connected to said mode selection circuit for providing said transmit signal or said receive signal to said synchronous demodulator wherein said transmit signal and said receive signal are provided to said synchronous demodulator and have either said first relative phase shift or said second relative phase shift provided therebetween, the selection of said first or said second relative phase shift determined by the state of said mode selection circuit;

means for generating a tuning signal which corresponds to a selected state of said output signal;

means for combining said output signal with said tuning signal to produce a control signal; and means responsive to said control signal for automatically driving said output signal to said selected state in response to activation of said mode selection circuit when said mode selection circuit is activated to select either said first or said second mode of operation for said metal detector circuit.

2. A metal detector circuit as recited in claim 1 further comprising means for generating an audio signal in response to said output signal and means for inhibiting for a predetermined time interval said audio signal, said audio signal being inhibited for a time period starting when said mode selector circuit is activated to start operation of the metal detector circuit in one of the operating modes.

3. The metal detector circuit recited in claim 1 wherein said mode selection circuit comprises;
   a three position switch having the switch arm thereof spring loaded to return from first and second outer positions to a center position; and
   a latch circuit which is set to a first state for said first mode of operation when said switch arm is driven to the first outer position and said latch circuit is set to a second state for said second mode of operation when said switch arm is driven to the second outer position.

4. The metal detector circuit recited in claim 3 including means for enabling said means for driving only when said switch arm is in one of said outer positions.

5. A metal detector circuit, comprising:
   an oscillator for producing a transmit signal;
   a transmit coil connected to receive said transmit signal and produce an electromagnetic field;
   a receive coil located in the region of said electromagnetic field for producing a receive signal;
   means for storing a first parameter for a first mode of operation for said metal detector circuit;
   means for storing a second parameter for a second mode of operation for said metal detector circuit;
   means for receiving said transmit signal or said receive signal and operating in conjunction with said means for storing a first parameter and said means for storing a second parameter to provide a first relative phase shift between said transmit signal and said receive signal for operation of said metal detector circuit in said first mode and a second relative phase shift between said transmit signal and said receive signal for operation of said metal detector circuit in said second mode;
   a synchronous demodulator connected to receive said transmit signal and a modified receive signal, after provision of said first or said second relative phase shifts, for demodulating said modified receive signal to produce an output signal, said output signal for indicating detection of an object by said metal detector circuit;
   a mode selection circuit having first and second states for respectively selecting said first mode or said second mode of operation for said metal detector circuit;
   means connected to said mode selection circuit for providing said transmit signal or said modified receive signal to said synchronous demodulator wherein said transmit signal and said receive signal have either said first relative phase shift or said second relative phase shift provided therebetween, the selection of said first or said second relative phase shift determined by the state of said mode selection circuit;
   means for generating a tuning signal which corresponds to a selected state of said output signal;
   means for combining said output signal with said tuning signal to produce a control signal;
   means for combining said control signal with said receive signal to produce said modified receive signal; and
   means for automatically driving said output signal to said selected state in response to activation of said mode selection circuit when said mode selection circuit is activated to select either said first or said second mode of operation for said metal detector circuit.

6. The metal detector circuit recited in claim 5 wherein said mode selection circuit comprises:
   a three position switch having the switch arm thereof spring loaded to return from first and second outer positions to a center position; and
   a latch circuit which is st to a first state for said first mode of operation when said switch arm is driven to the first outer position and said latch circuit is set to a second state for said second mode of operation when said switch arm is driven to the second outer position.

7. The metal detector circuit recited in claim 6 including means for enabling said means for driving said output signal only when said switch arm is in one of said outer positions.

8. A metal detector circuit, comprising:
   an oscillator for producing a transmit signal;
   a transmit coil connected to receive said transmit signal and produce an electromagnetic field;
   a receive coil located in the region of said electromagnetic field for producing an oscillatory receive signal;
   means for storing a first parameter for a first mode of operation for said metal detector circuit;
   means for storing a second parameter for a second mode of operation for said metal detector circuit;
   means for receiving said transmit signal or said receive signal and operating in conjunction with said means for storing a first parameter and said means for storing a second parameter to provide a first relative phase shift between said transmit signal and said receive signal for operation of said metal detector circuit in said first mode and a second relative phase shift between said transmit signal and said receive signal for operation of said metal detector circuit in said second mode;
   a synchronous demodulator connected to receive said transmit signal and a modified receive signal for demodulating said modified receive signal to produce an output signal, said output signal for indicating detection of an object by said metal detector circuit;
   a mode selection circuit having first and second states for respectively selecting said first mode or said second mode of operation for said metal detector circuit,
   means connected to said mode selection circuit for providing said transmit signal or said modified receive signal to said synchronous demodulator wherein said transmit signal and said receive signal have either said first relative phase shift or said second relative phase shift provided therebetween, the selection of said first or said second relative phase shift determined by the state of said mode selection circuit;

a low pass filter connected to receive said output signal for producing a DC output signal from said output signal;

means for generating a DC tuning signal which corresponds to a selected state of said DC output signal;

means for combining said DC output signal with said DC tuning signal to produce a DC control signal;

means for combining said oscillatory receive signal with said DC control signal to produce said modified receive signal for input to said synchronous demodulator; and means for automatically driving said DC output signal to said selected state in response to activation of said mode selection circuit when said mode selection circuit is activated to select either said first or said second mode of operation for said metal detector circuit.

9. The metal detector circuit recited in claim 8 wherein said mode selection circuit comprises:

a three position switch having the switch arm thereof spring loaded to return from first and second outer positions to a center position; and a latch circuit which is set to a first state for said first mode of operation when said switch arm is driven to the first outer position and said latch circuit is set to a second state for said second mode of operation when said switch arm is driven to the second outer position.

10. A method of operation for a metal detector circuit, comprising the steps of:

generating an oscillatory transmit signal;

directing said transmit signal through a transmit coil to produce an alternating electromagnetic field;

producing a receive signal in a receive coil which is located in the region of said electromagnetic field;

selecting and storing a first parameter for operating said metal detector circuit in a first mode;

selecting and storing a second parameter for operating said metal detector circuit in a second mode;

providing a first relative phase shift between said transmit signal and said receive signal for operating said metal detector circuit in said first mode and a second relative phase shift between said transmit signal and said receive signal for operating said metal detector circuit in said second mode, said step of providing carried out by receiving said transmit signal or said receive signal and operating in conjunction with said first stored parameter and said second stored parameter;

synchronuosly demodulating said receive signal, after having said first or said second relative phase shift provided between said transmit signal and said receive signal, to produce an oputput signal for indicating detection of an object by said metal detector circuit;

selecting said first or said second mode for operation of said metal detector circuit by operation of a mode selection circuit having respective first and second states;

supplying said transmit signal and said receive signal for said step of synchronously demodulating wherein said transmit signal and said receive signal supplied for each step of synchronous demodulating have either said first relative phase shift or said second relative phase shift provided therebetween, the selection of said first relative phase shift or said second relative phase shift determined by the state of said mode selection circuit, generating a tuning signal which corresponds to a selected state of said output signal;

combining said output signal with said tuning signal to produce a control signal; and automatically driving said output signal to said selected state in response to said control signal and in response to activation of said mode selection circuit when said mode selection circuit is activated to select either said first or said second mode of operation for said metal detector circuit.

11. A method of operation for a metal detector circuit, comprising the steps of:

generating an oscillatory transmit signal;

directing said transmit signal through a transmit coil to produce an alternating electromagnetic field;

producing a receive signal in a receive coil which is located in the region of said electromagnetic field;

selecting and storing a first parameter for operating said metal detector circuit in a first mode;

selecting and storing a second parameter for operating said metal detector circuit in a second mode;

providing a first relative phase shift between said transmit signal and said receive signal for operating said metal detector circuit in said first mode and a second relative phase shift between said transmit signal and said receive signal for operating said metal detector circuit in said second mode, said step of providing carried out by receiving said transmit signal or said receive signal and operating in conjunction with said first stored parameter and said second stored parameter;

synchronously demodulating a modified received signal, wherein said first or said second relative phase shift is provided between said transmit signal and said receive signal, to produce an output signal for indicating detecting of an object by said metal detector circuit;

selecting said first or said second mode of operation of said metal detector circuit by operation of a mode selection circuit having respective first and second states;

supplying said transmit signal and said modified receive signal for said step of synchronously demodulating wherein said transmit signal and said receive signal have either said first relative phase shift or said second relative phase shift provided therebetween, the selection of said first relative phase shift or said second relative phase shift determined by the state of said mode selection circuit, generating a tuning signal which corresponds to a selected state of said output signal;

combining said output signal with said tuning signal to produce a control signal;

combining said control signal with said receive signal to produce said modified receive signal; and automatically driving said output signal to said selected state in response to activation of said mode selection circuit when said mode selection circuit is activated to select either said first or said second mode of operation for said metal detector circuit.

* * * * *